US008670876B2

(12) United States Patent
Bell

(10) Patent No.: US 8,670,876 B2
(45) Date of Patent: Mar. 11, 2014

(54) ELECTRIC POWER CONTROL SYSTEM AND PROCESS

(75) Inventor: David G. Bell, Spokane, WA (US)

(73) Assignee: Utilidata, Inc., Providence, RI (US)

( * ) Notice: Subject to any disclaimer, the term of this patent is extended or adjusted under 35 U.S.C. 154(b) by 1118 days.

(21) Appl. No.: 12/540,364

(22) Filed: Aug. 13, 2009

(65) Prior Publication Data

US 2010/0090674 A1 Apr. 15, 2010

Related U.S. Application Data

(63) Continuation-in-part of application No. 11/397,091, filed on Apr. 4, 2006, now Pat. No. 7,729,810.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *G01R 21/00* | (2006.01) |
| *G01R 21/06* | (2006.01) |
| *G05F 5/00* | (2006.01) |

(52) U.S. Cl.
USPC ........... 700/298; 700/292; 700/293; 700/294; 700/297; 702/60; 702/61; 323/299

(58) Field of Classification Search
CPC ................ G06N 5/02; H02J 1/14; H02J 3/28; H02J 3/1878; Y02E 40/30
USPC .............. 700/292–294, 297–298; 702/60–61; 323/299–301
See application file for complete search history.

(56) References Cited

U.S. PATENT DOCUMENTS

| | | | |
|---|---|---|---|
| 4,028,599 A | 6/1977 | Zankl et al. | |
| 4,684,875 A | 8/1987 | Powell | |
| 5,300,870 A | 4/1994 | Smith | |
| 5,319,304 A * | 6/1994 | Whipple, III | ................. 324/107 |
| 5,466,973 A | 11/1995 | Griffioen | |
| 5,594,333 A * | 1/1997 | Whipple, III | ................. 324/142 |
| 6,104,179 A * | 8/2000 | Yukawa | ........................ 323/316 |
| 6,313,600 B1 | 11/2001 | Hammond et al. | |
| 6,356,745 B1 * | 3/2002 | Lee et al. | ................... 455/232.1 |
| 6,484,133 B1 | 11/2002 | Vogt | |
| 6,741,919 B1 | 5/2004 | Schuster et al. | |
| 7,069,117 B2 * | 6/2006 | Wilson et al. | ................. 700/295 |
| 7,729,810 B2 * | 6/2010 | Bell et al. | ...................... 700/295 |

(Continued)

OTHER PUBLICATIONS

Conservation Voltage Reduction (CVR) at Snohomish County PUD, IEEE Transactions on Power Systems, vol. 6, No. 3, Aug. 1991.

(Continued)

*Primary Examiner* — Ramesh Patel
(74) *Attorney, Agent, or Firm* — Foley & Lardner LLP; Christopher J. McKenna

(57) ABSTRACT

A method and apparatus for controlling electric power supplied to one or more electrical devices from a power source are disclosed. Measurements of the supplied electricity are detected. Estimated deviant voltage levels that the supplied electricity will not drop below or exceed as a result of varying electrical consumption by the one or more electrical devices is computed based on a predetermined confidence level and the detected measurements. A voltage level output of the electricity supplied to the electrical device is adjusted based on the computed deviant voltage level.

20 Claims, 6 Drawing Sheets

(56) References Cited

U.S. PATENT DOCUMENTS

| | | | |
|---|---|---|---|
| 8,390,227 | B2 | 3/2013 | Bell |
| 2004/0253489 | A1 | 12/2004 | Horgan et al. |
| 2005/0125104 | A1* | 6/2005 | Wilson et al. ................. 700/295 |
| 2006/0229768 | A1 | 10/2006 | Chassin et al. |

OTHER PUBLICATIONS

Reexam Non-Final Office Action for U.S. Appl. No. 90/009,512 dated Feb. 23, 2010.
Reexam Notice of Intent to Issue a Reexam Certificate for U.S. Appl. No. 90/009,512 dated Oct. 8, 2010.
US Notice of Allowance on U.S. Appl. No. 11/397,091 dated Feb. 8, 2010.
Office Action U.S. Appl. No. 11/397,091 dated May 19, 2008.
Office Action U.S. Appl. No. 11/397,091 dated Nov. 13, 2007.
Office Action U.S. Appl. No. 11/397,091 dated Jun. 25, 2009.
Office Action U.S. Appl. No. 11/397,091 dated Dec. 15, 2008.
Office Action U.S. Appl. No. 12/540,366 dated Sep. 24, 2012.
US Notice of Allowance DTD Dec. 13, 2012.
US Office Action on U.S. Appl. No. 13/784,069 DTD Jun. 14, 2013.

\* cited by examiner

ELECTRIC POWER CONTROL SYSTEM AND PROCESS

CROSS-REFERENCE TO RELATED APPLICATIONS

These claimed embodiments relate to a method for regulating The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the following listed application(s):

1. United States patent application entitled ELECTRIC POWER CONTROL SYSTEM AND EFFICIENCY OPTIMIZATION PROCESS FOR A POLYPHASE SYNCHRONOUS MACHINE, naming David G. Bell as inventors, filed substantially contemporaneously herewith.

2. U.S. patent application Ser. No. 11/397,091, entitled ELECTRICAL POWER DISTRIBUTION CONTROL SYSTEMS AND PROCESSES, naming David G. Bell; Thomas L Wilson; and Kenneth M. Hemmelman as inventors, filed Apr. 4, 2006.

TECHNICAL FIELD

These claimed embodiments relate to a method for regulating electric power being supplied to one or more electrical or electronic loads and more particularly to adjusting voltage levels of power provided to the electrical or electronic device(s) based on estimates determined from the electrical or electronic device(s) consumption.

BACKGROUND OF THE INVENTION

A method and apparatus for regulating electric power being supplied to one or more electrical or electronic device(s) is disclosed.

When supplying power to large industrial devices that consume a tremendous amount of electrical power, several needs compete and must be simultaneously considered in managing electrical power distribution. A first concern has to do with maintaining delivered electrical power voltage levels within predetermined limits. A second concern relates improving overall efficiency of electrical power usage and distribution. A third concern relates to these and other concerns in light of changing electrical loading of the system and variations in the character of the loading so that the voltages do not decrease to such a level that the devices shut down or function improperly.

One way to accommodate changes in electrical loading is to set preset threshold levels at which the voltage level of the distribution system changes. When the system detects a change in the voltage level, a tap change is initiated (on a multiple-tap transformer) resulting in a system voltage change. A drawback of this system is that the tap may change frequently thus increasing the tap mechanism failure rate. Further the system voltage level may drop suddenly so the preset threshold levels must be set sufficiently high to prevent shutdown resulting in system inefficiencies.

SUMMARY OF THE INVENTION

In one implementation a method is disclosed that continuously detects measurements of electrical power supplied to one or more electrical devices from a power source. Estimated deviant voltage levels that the supplied electricity will not drop below or exceed as a result of varying electrical consumption by the one or more electrical devices are continuously computed. The deviant voltage levels may be computed based on a predetermined confidence level and specific properties of the effects on measured voltage due to varying consumption computed from the detected measurements. A voltage level output of the electricity supplied to the electrical device may be adjusted based on the computed deviant voltage level. In an additional implementation, the deviant voltage levels may be based on measurements obtained from each of the three phases in a three-phase electric power distribution system. A voltage level supplied to the three-phase distribution system may be adjusted by a voltage regulator capable of setting three-phase voltages.

In another implementation, a system is disclosed including an electronic meter, a processor and a voltage regulator device. The electronic meter continuously detects measurements of electricity supplied to one or more electrical devices from a power source. The processor is in communication with the electronic meter to continuously compute estimated deviant voltage levels that the supplied electricity will not drop below or exceed as a result of varying electrical consumption by the electrical device and the detected measurements. The voltage regulator device receives a signal from the processor to adjust a voltage level output of the electricity supplied to the electrical device from the power source based on the computed deviant voltage level.

In addition, a computer readable storage medium comprising instructions is disclosed. The instructions when executed by a processor continuously detect measurements of electricity supplied to one or more devices from a power source. The instructions also continuously compute estimated deviant voltage levels that the supplied electricity are not expected to drop below or to exceed with some level of confidence as a result of varying electrical consumption by the one or more electrical devices. In one implementation the deviant voltage level is computed based on a predetermined confidence level and the detected measurements. The instructions also provide a signal to adjust a voltage level output of the electricity supplied to the one or more electrical devices based on the computed estimated deviant voltage level.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
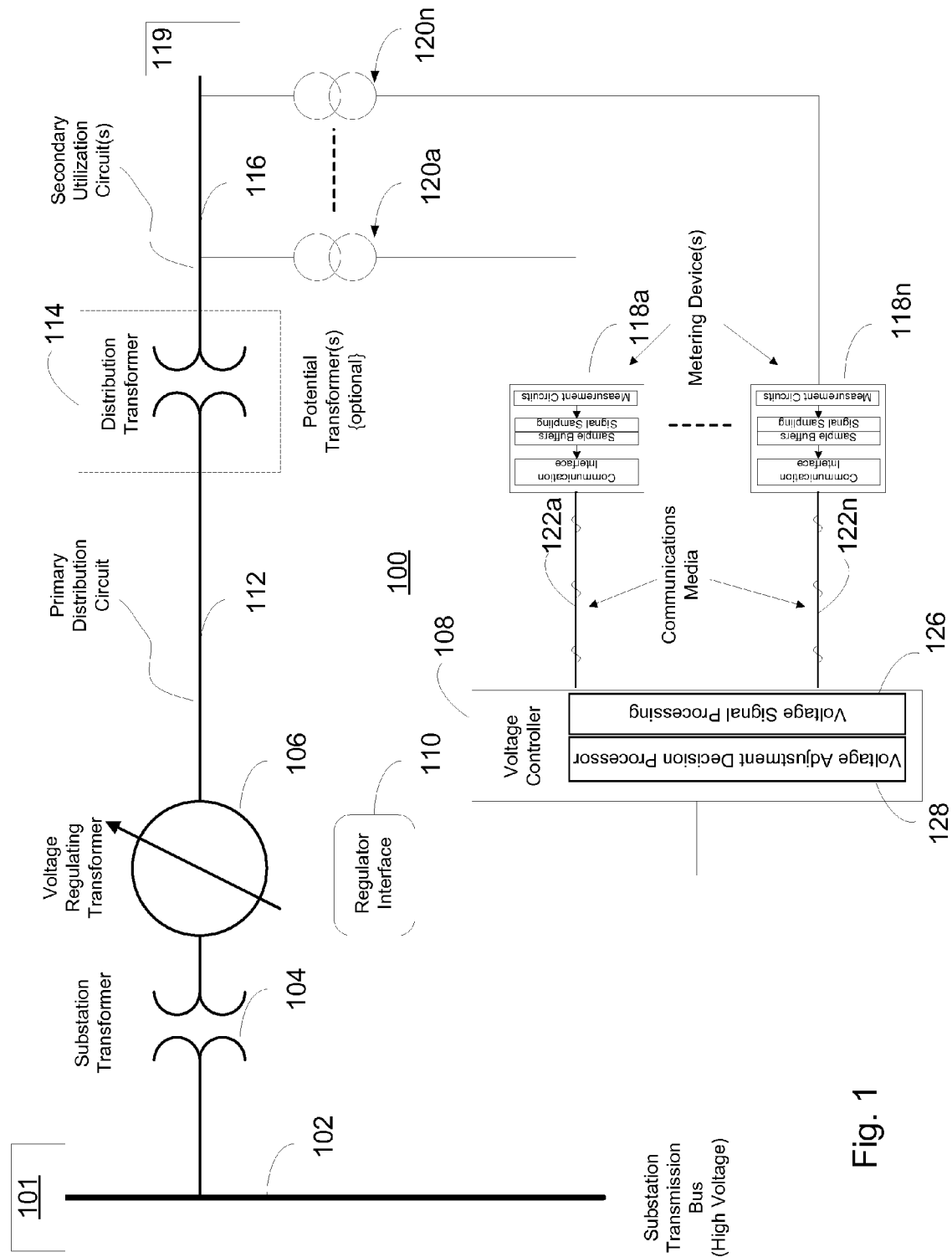
FIG. 1 is a simplified schematic diagram of a voltage control system for regulating power.

Referring to FIG. 1 there is shown a voltage control system 100 having power source 101 connected via a subsystem transmission bus 102 and via substation transformer 104 to a voltage regulating transformer 106. Voltage regulating transformer 106 is controlled by voltage controller 108 with regulator interface 110. Voltage regulating transformer 106 is optionally coupled on primary distribution circuit 112 via optional distribution transformer 114 to secondary utilization circuits 116 and to one or more electrical or electronic devices 119. Voltage regulating transformer 106 has multiple tap outputs (not shown) with each tap output supplying electricity with a different voltage level. The illustrated system described herein may be implemented as either a single-phase or three-phase distribution system.

In an AC Power distribution system and as used herein voltage may be generally is referred to as an "RMS Voltage". The regulating transformer 106 is typically one of two basic types: (1) a multi-tap autotransformer (single or three phase), which are used for distribution; or (2) on-load tap changer (three phase transformer), which is integrated into a substation transformer and used for both transmission and distribution.

Monitoring devices 118a-118n are coupled through optional potential transformers 120a-120n to secondary utilization circuits 116. Monitoring devices 118a-118n continuously detects measurements and continuous voltage signals of electricity supplied to one or more electrical devices 119 connected to circuit 112 or 116 from a power source 101 coupled to bus 102. Monitoring devices 118a-118n are coupled through communications media 122a-122n to voltage controller 108.

Voltage controller 108 continuously computes estimated deviant voltage levels that the supplied electricity will not drop below or exceed as a result of varying electrical consumption by the one or more electrical devices. The deviant voltage levels are computed based on a predetermined confidence level and the detected measurements (as explained in more detailed herein). Voltage controller 108 includes a voltage signal processing circuit 126 that receives sampled signals from metering devices 118a-118n. Metering devices 118a-118n process and sample the continuous voltage signals such that the sampled voltage signals are uniformly sampled as a time series that are free of spectral aliases. Such metering devices having this process and sample capability are generally commercially available.

Voltage signal processing circuit 126 receives signals via communications media from metering devices 118 processes the signals and feeds them to voltage adjustment decision processor circuit 128. Although the term "circuit" is used in this description, the term is not meant to limit this disclosure to a particular type of hardware or design, and other terms known generally known such as the term "element", "hardware", "device" or "apparatus" could be used synonymously with or in place of term "circuit" and may perform the same function. Adjustment decision processor circuit 128 determines a voltage location with respect to a defined decision boundary and sets the tap position and settings in response to the determined location. More specifically adjustment decision processing circuit 128 in voltage controller 108 computes a deviant voltage level that is used to adjust the voltage level output of electricity supplied to the electrical device. In other words, one of the multiple tap settings of regulating transformer 106 is continuously selected by voltage controller 108 via interface 110 to supply electricity to the one or more electrical devices based on the computed deviant voltage level. Regulator interface 110 may include a processor controlled circuit for selecting one of the multiple tap settings in voltage regulating transformer 106 in response to an indication signal from voltage controller 108.

As the computed deviant voltage level changes other tap settings (or settings) of regulating transformer 106 are selected by voltage controller 108 to change the voltage level of the electricity supplied to the one or more electrical devices.

Figure 2:
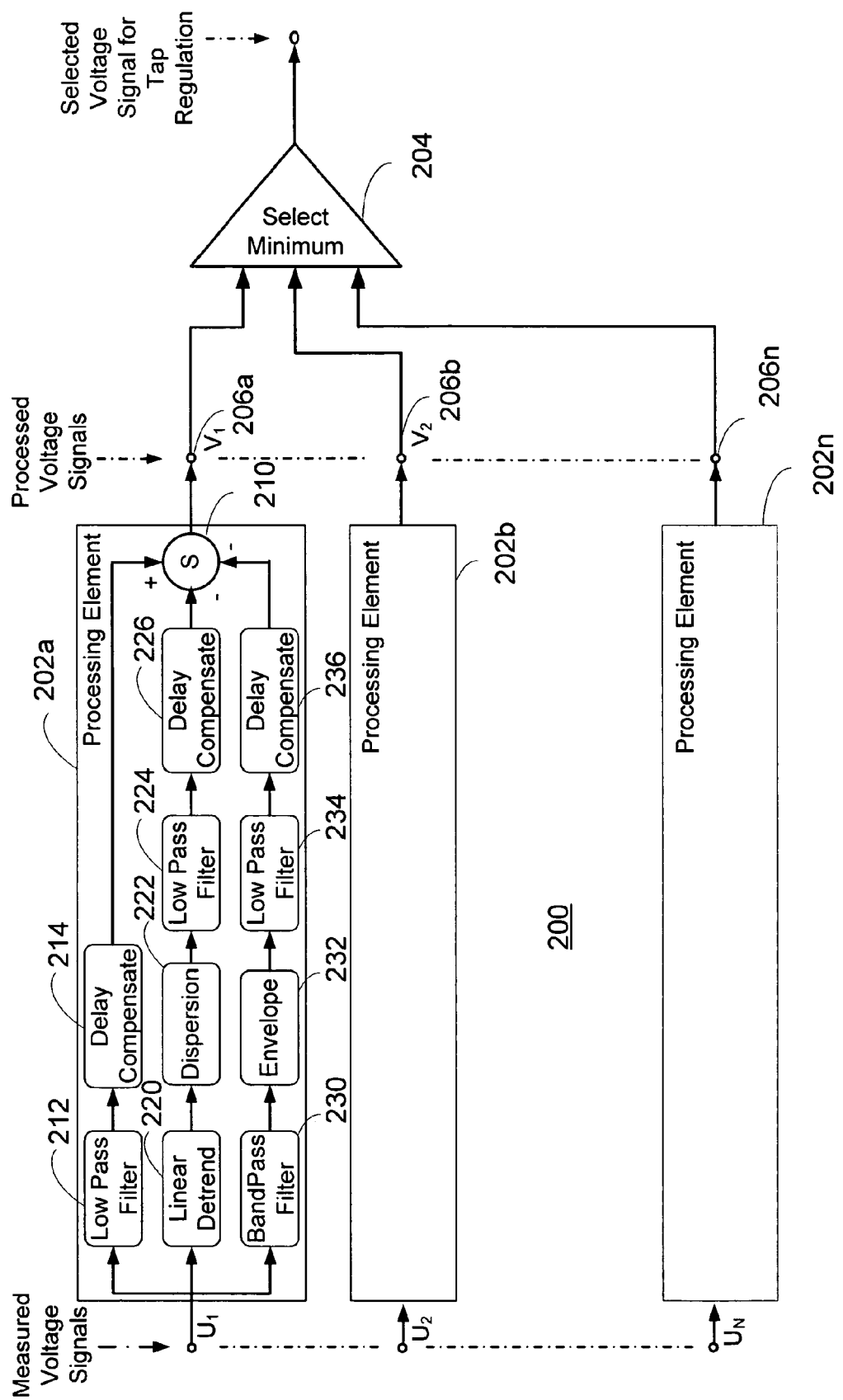
FIG. 2 is a simplified schematic diagram of a voltage signal processing element shown in FIG. 1 that processes measured voltage signals to provide a selected voltage signal for tap regulation.

Referring to FIG. 2, voltage signal processing element 200 is shown having processing elements 202a-202n coupled to minimum selector circuit 204. Each of the processing elements 202a-202n receives on their respective input terminals a measured voltage signal from a respective metering device 118a-118n (FIG. 1). Processing elements 202a-202n processes the measured signal (as described herein) and generates a processed voltage signal on their output terminals 206a-206n respectively. Minimum selector circuit 204 selects the processed voltage signal having the minimum voltage and provides the selected signal to the voltage adjustment decision processor circuit 128 for further processing in tap setting regulation.

Processing elements 202a-202n are identical and thus only one element, 202a will be described. Processing element 202a includes three parallel processing paths that are coupled to summation circuit 210. Each of the processing elements receives sampled time series signals from metering devices 118a-118n.

In the first path, a low pass filter circuit 212 receives the measured voltage signal, applies a low pass filter to the signal and feeds the low pass filtered signal to delay compensate circuit 214 where the signal or an estimate of the signal is extrapolated in time such that the delay resulting from the low pass filtering operation is removed and then fed to summation circuit 210.

Figure 6:
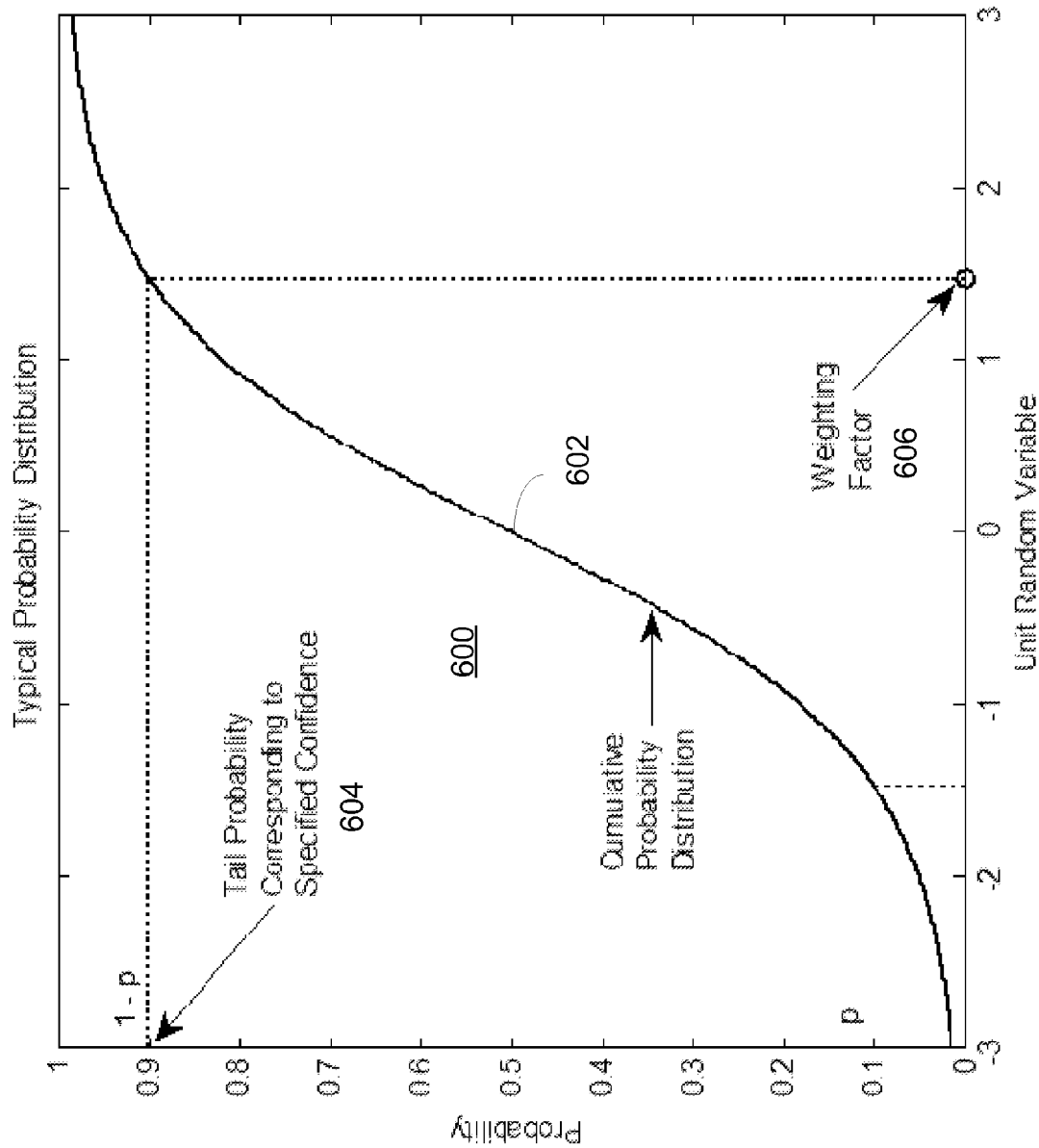
FIG. 6 is a diagram illustrating a typical probability distribution of the voltage control system that is used to select a weighting factor that is used in estimating voltage deviations.

In the second path, a linear detrend circuit 220 receives the measured voltage signal, and removes any linear trends from the signal. The resulting signal, having zero mean and being devoid of any change in its average value over its duration, is then applied to dispersion circuit 222 where a zero mean dispersion is estimated for the signal. The zero mean dispersion estimated signal is fed to low pass filter circuit 224 that applies a low pass filter to the signal. The filtered signal is then fed to delay compensation circuit 226 where the filtered signal or an estimate of the filtered signal is extrapolated in time such that the delay resulting from the low pass filtering operation is removed. A weighting factor 606 is shown in FIG. 6 and is described in connection therewith. Weighting factor 606 is derived from a specified confidence level as described herein and is applied to the signal output from element 226 before being fed as a delay compensated signal to summation circuit 210.

In the third path, a band pass filter circuit 230 receives the measured voltage signal, and applies a band pass filter to the signal. The filtered signal is then applied to an envelope circuit 232 where the signal is formed into a peak envelope with specified peak decay characteristics. The peak envelope signal is fed to low pass filter circuit 234 that applies a low pass filter to the signal to provide a filtered smooth peak envelope voltage signal, and feeds the signal to delay compensation circuit 236 where the filtered smooth peak envelope voltage signal or an estimate thereof is extrapolated in time such that the delay resulting from the low pass filtering operation is removed before being fed to as a delay compensated signal to summation circuit 210.

Example Voltage Controller Architecture

Figure 3:
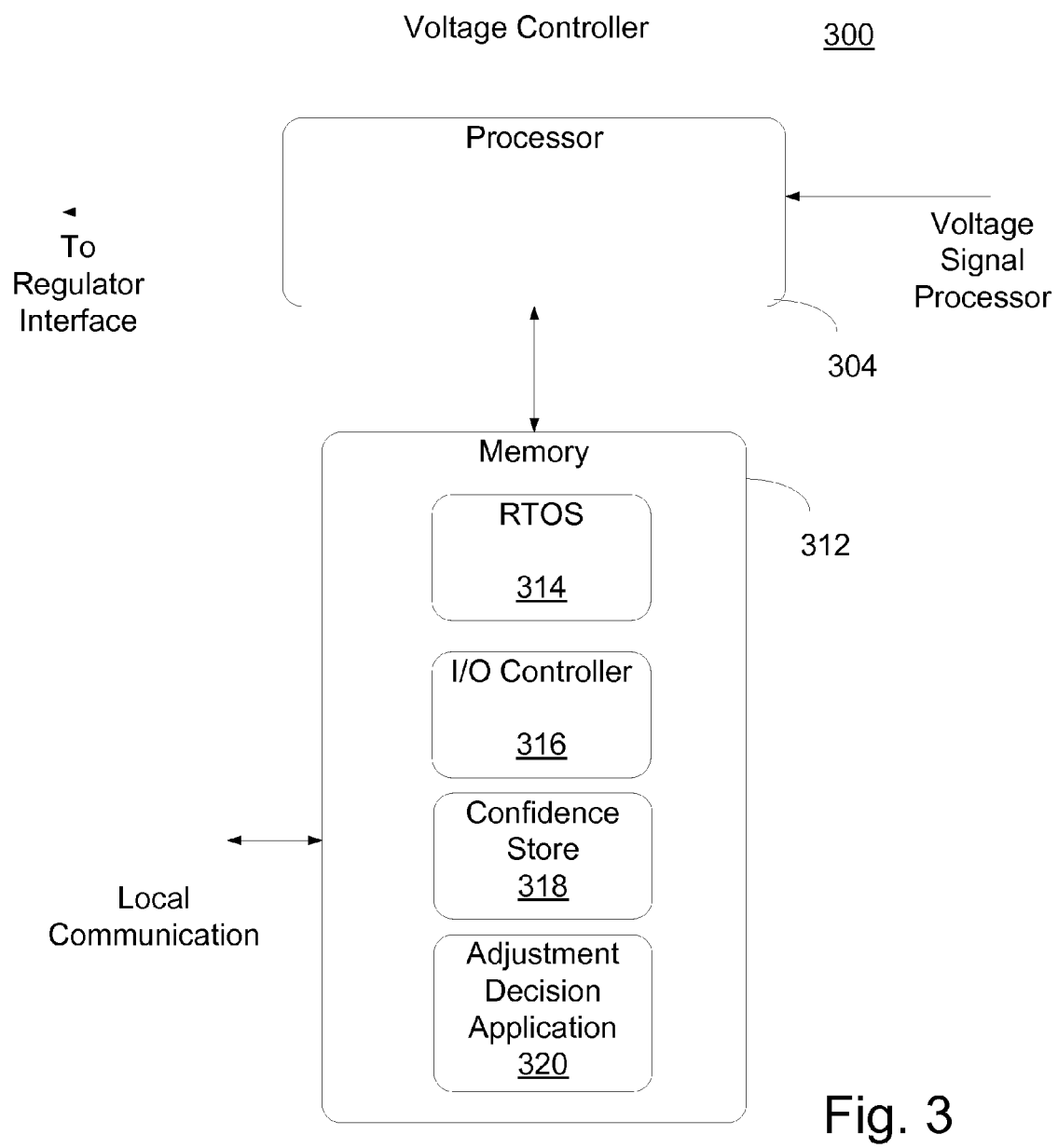
FIG. 3 is a simplified schematic diagram of a voltage controller shown in FIG. 1.
Figure 4:
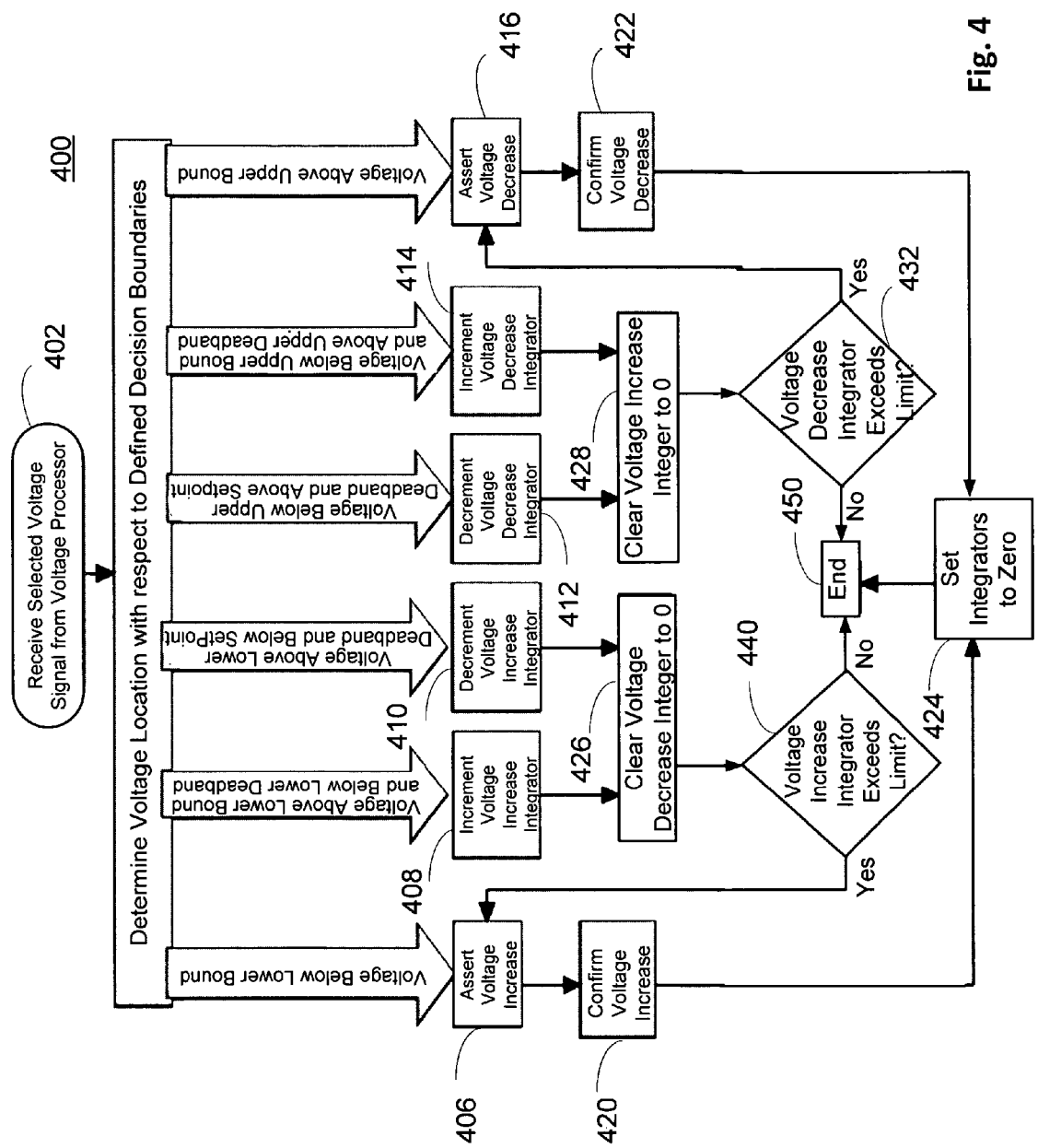
FIG. 4 is a flow chart of a process for determining a voltage adjustment decision by the voltage controller shown in FIG. 3.

In FIG. 3 are illustrated selected modules in Voltage Controller 300 using process 400 shown in FIG. 4. Voltage Controller receives Signals from voltage signal processing circuit 126 and feeds signals to regulator interface 110. Voltage Controller 300 has processing capabilities and memory suitable to store and execute computer-executable instructions. In one example, Voltage Controller 300 includes one or more processors 304 and memory 312.

The memory 322 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 322 of the Voltage Controller 300 may include a real time operating system 314, an I/O controller 316, a confidence store 318, and an adjustment decision application 320. Real time operating system 314 may be used by adjustment decision application 320 to operate controller 300. I/O controller may provide drivers for Voltage controller to communicate with Voltage signal processor or regulator interface. A confidence store 318 may include preconfigured parameters (or set by the user before or after initial operation) such a confidence values, electrical device operating parameters, voltage levels, deadband, setpoint values and probabilities. Such values may be update through an interface with the user directly to the voltage controller (not shown). Details of the adjustment decision application and process are described in FIG. 4.

Illustrated in FIG. 4, is a process 400 for determining a voltage adjustment decision. The exemplary process in FIG. 4 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIG. 4, although it may be implemented in other system architectures.

Figure 5:
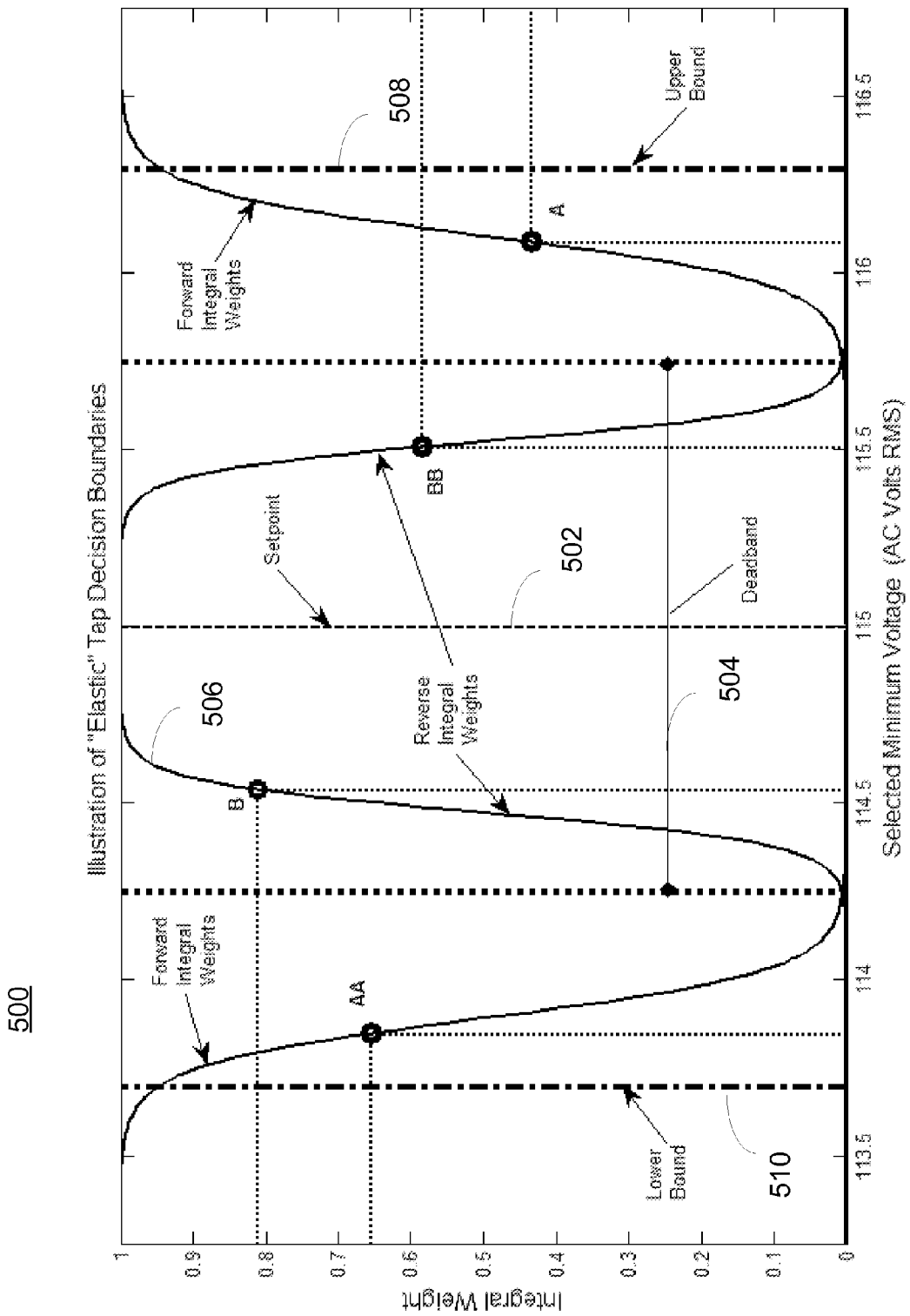
FIG. 5 is a diagram illustrating an exemplary elastic decision boundaries used by the voltage control system.

Referring to FIG. 4, a process 400 is shown for determining a voltage adjustment decision by voltage adjustment decision processor circuit 128 using the processor and modules shown in FIG. 3. In the process, the selected voltage signal is received from the voltage signal processing element 200 (FIG. 2) in block 402. In block 404, a determination is made of the location of the voltage with respect to defined boundary decisions. A graph of exemplary voltage locations and their boundaries is shown in FIG. 5. The decision boundaries were preset based on characteristics of the electrical and electronic devices comprising the loads and confidence levels as discussed herein.

If a determination is made that the received selected voltage is below a lower boundary, an assert voltage increase is executed in block 406. When a voltage increase assertion is executed an increase indication signal is sent to voltage regulating transformer 106 via the regulator interface 110 to increase the tap setting, thereby increasing the delivered voltage.

If a determination is made that the received selected voltage is above the lower bound and below the lower deadband, an increment voltage increase integrator is executed in block 408. If a determination is made that the received selected voltage is above the lower deadband and below the setpoint, a decrement voltage increase integrator is executed in block 410.

If a determination is made that the received selected voltage is below the upper deadband and above the setpoint, a decrement voltage increase integrator is executed in block 412. If a determination is made that the received selected voltage is below the upper bound and above the upper dead band, an increment voltage decrease integrator is executed in block 414.

If a determination is made that the received selected voltage is about the upper bound, an assert voltage decrease is executed in block 416. When an assert voltage decrease is executed a decrease indication signal is sent to voltage regulator transformer via the regulator interface 110 to decrease the tap voltage.

After the assert voltage increase is executed in block 406, a confirm voltage increase is executed in block 420. After the assert voltage decrease is executed in block 416, a confirm voltage decrease is executed in block 422. After executing the confirm voltage increase in block 420 and confirm voltage decrease in block 422, a set all integrators to zero is executed in block 424.

After executing the increment voltage increase integrator in block 408 and the decrement voltage increase integrator in block 410, a set voltage decrease integrator to a zero is executed in block 426. After executing the decrement voltage decrease integrator in block 412 and the increment voltage decrease integrator in block 414, a set voltage increase integrator to a zero is executed in block 428.

After executing set voltage decrease integrator to zero is executed in block 426, a determination is made in block 440 whether the voltage increase integrator exceeds a predetermined limit. If the voltage increase integrator exceeds the predetermined limit, then a voltage increase is asserted in block 406 and confirmed in block 420. If the voltage increase integrator does not exceed the predetermined limit, then the process ends in block 450.

After executing set voltage increase integrator to zero is executed in block 428, a determination is made in block 432 whether the voltage decrease integrator exceeds a predetermined limit. If the voltage increase integrator exceeds the predetermined limit, then a voltage decrease is asserted in block 416 and confirmed in block 422. If the voltage decrease integrator does not exceed the predetermined limit, then the process ends in block 450.

Confirmation of a voltage increase or decrease may be implemented by detecting a step change in one or more voltage(s) measured by corresponding metering device(s) 118a-118n. An exemplary method for detection of such a step change involves computation of the statistical moments of a voltage time series segment which is expected to manifest a step change, and comparing those moments with those for an ideal step change such as the Heaviside step function. This method of moment matching is described, for example, in a different context by Tabatabai, A. J. and Mitchell, O. R., "Edge Location to Subpixel Values in Digital Imagery", IEEE Transactions on Pattern Analysis and Machine Intelligence Volume PAMI-6, No. 2, pp 188-210, 1984. The magnitude of the step change thus computed may then be compared to that expected by the change in the voltage regulator tap setting to confirm that the voltage change has occurred.

Once the voltages are confirmed in blocks 420 and 422 all integrators are set to zero in block 424 and the process ends in bock 450.

If the voltage decrease integrator does not exceed the predetermined limit, and after setting all integrators to zero in block 448, the process ends in block 450. After ending in block 450 the process may repeat again upon receiving the selected signal from the voltage processor in block 402.

Referring to FIG. 5, there is shown graph 500 illustrating exemplary elastic tap decision boundaries used by the process described in FIG. 4. On the x-axis of graph 500 are the salient voltages and on the y-axis is shown selected integral weights assigned to the voltage regions. A set point voltage 502 is indicated at the center voltage level, and a dead band 504 is assigned at equal voltage displacements from the set point voltage.

An upper bound 508 and lower bound 510 are outside the deadband and are defined based on the predetermined confidence level using the formulas described herein. The forward integration regions are defined as the region between the deadband and the upper bound, or between the deadband and the lower bound. The forward integral weights are applied in these regions. The reverse integration regions are defined as the regions between the dead band and the set point voltage 502.

Exemplary Tap Response to Voltage Changes on Curved Decision Boundaries

In one implementation when the received selected voltage signal from the voltage processor is at a selected minimum voltage at Point 'A', the nonlinear integral associated with a tap decrease decision will be incremented. If the received selected voltage signal remains within the indicated region, eventually a voltage tap decrease will be asserted. Similarly, when the selected minimum voltage appears at Point 'AA', the nonlinear integral associated with a tap increase decision will be incremented, eventually resulting in a voltage tap increase assertion.

On the other hand if when the received selected voltage signal from the voltage processor is at a selected minimum voltage at Point 'B', the nonlinear integral associated with a tap increase decision will be decremented and eventually nullifying the pending tap decision. Similarly, when the selected minimum voltage appears at Point 'BB', the nonlinear integral associated with a tap decrease decision will be decremented, eventually nullifying the pending tap decision.

Background for Dispersion and Variance

For a subject time series obtained by uniform sampling of a random process, comprising sample values:

$x_k$, $1 \leq k \leq n$, one may estimate the scale of the sampled time series as either the sample variance or the sample dispersion, depending on the properties of the random process from which the samples are obtained.

First, an estimate of the statistical location, often referred to as the average or mean, is required. For some non-gaussian random processes, the sample mean does not suffice for this purpose, motivating the use of the median or other robust measures of sample location. In the formulas that follow, we shall designate the location estimate as $\bar{x}$.

A class of non-gaussian random processes is characterized by heavy-tailed probability densities, which are often modeled for analytical purposes as alpha-stable distributions and are thus referred to as alpha-stable random processes. For an exemplary reference on the application of such distributions in signal processing, see: Nikias, C. L. and Shao, M., "Signal Processing with Alpha-Stable Distributions and Applications", John Wiley & Sons, 1995. For time series sampled from non-gaussian alpha-stable random processes, one may estimate the scale as the sample dispersion:

$$d = e^{\frac{1}{n}\sum_{k=1}^{n} \ln|x_k - \bar{x}|}, \text{ for } x_k \neq \bar{x}$$

For time series sampled from gaussian random processes, one may estimate the scale as the sample variance:

$$s = \frac{1}{n-1}\sum_{k=1}^{n}(x_k - \bar{x})^2$$

The choice of the location and scale estimates may be motivated by the properties of the subject random process, which can be determined, for example, by examination of estimates of the probability density of the random process.

Weighting Factors and Integrals Formulas for Use with a Voltage Control Processor The deviation voltage used in the decision boundary integrals is computed as the difference between the selected minimum voltage and the voltage setpoint:

$\Delta v = v_{min} - v_{set}$

The computation of the weighting factors requires that the parameters for the weighting functions be defined and available to the voltage controller processor. The following example will use the first-order sigmoid function as the nonlinear weighting function but many others may be applied to achieve different integrating behavior; for example, trigonometric functions, linear or trapezoidal functions, polynomial functions, spine fitting functions, or exponential functions of any order could serve here. In the following definitions, specific subscripts will be used to denote the region of application of the defined quantity.

subscript a shall indicate the region above the setpoint voltage $v_{set}$ subscript b shall indicate the region below the setpoint voltage $v_{set}$ subscript f shall indicate quantities used in the forward (incrementing) integrals subscript r shall indicate quantities used in the reverse (decrementing) integrals Thus, define $v_{af}$, $v_{bf}$ as the inflection points of the sigmoid functions for the weights for the upper (voltage decrease) and lower (voltage increase) forward integrals, respectively.

Similarly, define $v_{ar}$, $v_{br}$ as the inflection points of the sigmoid functions for the weights for the upper (voltage decrease) and lower (voltage increase) reverse integrals, respectively.

Define $2\Delta v_d$ as the magnitude of the voltage deadband, symmetrical around the voltage setpoint.

Assigning the quantity $\beta$ as the slope parameter for the first-order sigmoid and the quantity $\omega$ as the voltage corresponding to the location of the inflection point, we can define the nonlinear weighting functions for the four regions of interest:

$\omega_{af}=[1+e^{\beta_{af}(v_{af}-v_{min})}]^{-1}$ is the upper forward integral weight function $\omega_{ar}=[1+e^{\beta_{ar}(v_{min}-v_{ar})}]^{-1}$ is the upper reverse integral weight function $\omega_{bf}=[1+e^{\beta_{bf}(v_{min}-v_{bf})}]^{-1}$ is the lower forward integral weight function $\omega_{br}=[1+e^{\beta_{br}(v_{br}-v_{min})}]^{-1}$ is the lower reverse integral weight function The upper voltage adjustment decision integral may now be written as $$\Psi_a = \frac{1}{T_a}\int \left(\omega_{af}\Delta v|_{\Delta v>v_{set}+v_d} - \omega_{ar}\Delta v|_{\Delta v<v_{set}+v_d}\right) dt$$

and the lower voltage adjustment decision integral as $$\Psi_b = -\frac{1}{T_b}\int \left(\omega_{bf}\Delta v|_{\Delta v<v_{set}-v_d} - \omega_{br}\Delta v|_{\Delta v>v_{set}-v_d}\right) dt$$

The voltage controller then asserts a voltage decrease signal (causing the voltage regulating transformer 106 to tap down) if either $\Delta v > v_a - v_{set}$ or $\Psi_a > v_a - v_{set}$; in either case, the controller further determines that the 'tap down' operation will not cause the voltage regulating transformer 106 to exceed the lowest tap position permitted by the regulator interface device.

Similarly, the voltage controller then asserts a voltage increase signal (causing the voltage regulating transformer 106 to tap up) if either $\Delta v < v_b - v_{set}$ or $\Psi_b < v_b - v_{set}$; in either case, the controller further determines that the 'tap up' operation will not cause the voltage regulating transformer 106 to exceed the highest tap position permitted by the regulator interface device.

Referring to FIG. 6, diagram 600 is shown having cumulative probability distribution curve 602 illustrating a typical probability distribution of the voltage control system that is used to select a weighting factor that is used in estimating voltage deviations. The x-axis corresponds to a unit random variable and the y-axis corresponds to a probability. In one implementation a "Tail Probability" 604 or (1−p) is computed using the formula "p=(1−a)/2", where "a" is the specified confidence level and "p" is the tail probability. A "Weighting Factor" 606 is the value of the unit random variable (also generally referred to as "normalized") as located on the Probability Distribution corresponding to the Tail Probability. Although a typical probability distribution is shown, the particular probability distribution that is applied may vary depending on the properties of the electrical load for the electrical or electronic devices.

From the foregoing, it is apparent the description provides systems, processes and apparatus which can be utilized to monitor and manage electrical power distribution. Further, the disclosed systems, processes and apparatus permit power conservation by maintaining delivered voltages near levels that optimize the efficiency of the connected electrical and electronic devices and also can provide more robust power delivery under inclement power system loading conditions. In addition, the systems, processes and apparatus of the present system are cost effective when compared with other power management devices. In contrast to prior art systems, the present systems, processes and apparatus provide infinite variability of system parameters, such as multiple, different delivered voltage levels, within predetermined limits. For example, all users can be incrementally adjusted up or down together, or some users may be adjusted to a first degree while other users are adjusted to another degree or to separate, differing degrees. Such advantageously provides new flexibility in power distribution control, in addition to providing new methods of adjustment.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A method comprising:
    detecting, by an electronic meter, measurements of electricity supplied to one or more electrical devices via a voltage regulator;
    computing, by a voltage controller, an estimated deviant voltage level based on varying electrical consumption by the one or more electrical devices, the estimated deviant voltage level computed based on a predetermined confidence level and the measurements, wherein the predetermined confidence level corresponds to a probability distribution indicative of a characteristic of the electricity supplied to the electrical device; and
    adjusting, by the voltage regulator, responsive to the estimated deviant voltage, a voltage level output of the electricity supplied to the one or more electrical devices.

2. The method as recited in claim 1, wherein the voltage regulator comprises multiple tap settings with each tap setting supplying electricity with a different voltage level, and wherein adjusting the voltage level output of the electricity supplied to the one or more electrical devices based on the estimated deviant voltage level comprises:
    selecting one of the multiple tap settings to supply electricity to the one or more electrical devices based on the estimated deviant voltage level.

3. The method of claim 2, wherein selecting one of the multiple tap outputs to supply electricity to the one or more electrical devices based on the estimated deviant voltage level further comprises:
    asserting a decrease in one of the multiple tap settings if either a selected estimated deviant voltage exceeds a predetermined voltage level derived from a setpoint voltage or an accumulated nonlinear weighted time integral of the selected estimated deviant voltage exceeds the predetermined voltage level.

4. The method of claim 2, wherein selecting one of the multiple tap settings to supply electricity to the one or more electrical devices based on the estimated deviant voltage level further comprises:
    asserting an increase in one of the multiple tap settings if either a selected estimated deviant voltage falls below a predetermined voltage level derived from a setpoint voltage, or an accumulated nonlinear weighted time integral of a selected minimum estimated deviant voltage falls below the predetermined voltage level.

5. The method as recited in claim 1, wherein the computing of the estimated deviant voltage level responsive to the varying electrical consumption by the one or more electrical devices comprises at least one of:
    (i) estimating a low-pass spectral behavior of one or more observed voltage time series of the electricity supplied to the one or more electrical devices, with a spectral cutoff frequency consistent with a voltage adjustment decision period;
(ii) estimating a dispersion or variance of each observed voltage level;
(iii) estimating a first-order envelope of the minimum values of each observed voltage level;
(iv) applying weighting factors to the estimated dispersions consistent with configured confidence specifications thereby estimating a voltage deviation that will not be exceeded with the specified confidence;
(v) computing a forecast minimum for each observed voltage by combining the results of (i), (iii), and (iv) and selecting a forecast minimum voltage from these results;
(vi) comparing the selected forecast minimum voltage against a prespecified voltage bound;
(vii) incrementing a nonlinear weighted time integral for the selected forecast minimum voltage if the forecast minimum voltage is less than one voltage regulator tap step voltage below the target but greater than a lower voltage bound; and
(viii) decrementing a nonlinear weighted time integral if the selected forecast minimum voltage approaches the target voltage closer than one voltage regulator tap step voltage.

6. The method as recited in claim 1 wherein detecting measurements of electricity supplied to the one or more electrical devices via the voltage regulator comprises:
detecting a tap setting and a regulator load voltage of one or more taps of the voltage regulator.

7. The method as recited in claim 1, wherein computing the estimated deviant voltage level comprises:
filtering the voltage time series of the supplied electricity to derive a filtered voltage time series;
estimating a smooth delay compensated zero-mean dispersion of the voltage time series; and
producing a delay compensated smoothed negative peak envelope of the voltage time series.

8. A system comprising:
an electronic meter configured to detect measurements of electricity supplied to one or more devices via a voltage regulator;
a processor in communication with the electronic meter configured to compute an estimated deviant voltage level based on varying electrical consumption by the one or more electrical devices, the estimated deviant voltage level computed based on a predetermined confidence level and the measurements, wherein the predetermined confidence level corresponds to a probability distribution indicative of a characteristic of the electricity supplied to the electrical device; and
the voltage regulator configured to receive a signal from the processor indicating an adjustment to a voltage level output of the electricity supplied to the one or more electrical devices.

9. The system as recited in claim 8 wherein the voltage regulator includes multiple tap settings with each tap setting operative to supply electricity with a different voltage level, and wherein the processor further comprises:
a control mechanism configured to generate a signal indicating to select one of the regulator multiple tap settings supplying electricity to the one or more electrical devices based on the estimated deviant voltage level.

10. The system as recited in claim 9 wherein the electronic meter comprises:
means for detecting a tap position and a regulator load voltage of one or more taps of the regulating transformer.

11. The system of claim 9, wherein the control mechanism configured to select one of the multiple tap settings comprises:
means for asserting a decrease in one of the multiple tap settings either if a selected estimated deviant voltage exceeds a predetermined voltage level derived from a setpoint voltage or if an accumulated nonlinear weighted time integral of a selected estimated deviant voltage exceeds the predetermined voltage level.

12. The system of claim 9, wherein the control mechanism further comprises:
means for asserting an increase in one of the multiple tap settings either if a selected estimated deviant voltage fall below a predetermined voltage level derived from a setpoint voltage, or if an accumulated nonlinear weighted time integral of a selected minimum estimated deviant voltage falls below the predetermined voltage level.

13. The system as recited in claim 8 wherein the processor computes the deviant voltage level by:
(i) estimating a low-pass spectral behavior of each observed voltage time series of the electricity supplied to the one or more electrical devices, with a spectral cutoff frequency consistent with a voltage adjustment decision period;
(ii) estimating a dispersion or variance of each observed voltage;
(iii) estimating a first-order envelope of the minimum values of each observed voltage;
(iv) applying weighting factors to the estimated dispersions consistent with configured confidence specifications thereby estimating a voltage deviation that will not be exceeded consistent with the specified confidence;
(v) computing a forecast minimum for each observed voltage from the results in (i), (iii), and (iv) and selecting a forecast minimum voltage from these results;
(vi) comparing the selected forecast minimum voltage against a prespecified voltage bound;
(vii) incrementing a nonlinear weighted time integral for the selected forecast minimum voltage if the forecast minimum voltage is less than one regulator tap step voltage below the target but greater than a lower voltage bound; and
(viii) decrementing a nonlinear weighted time integral if the selected forecast minimum voltage approaches the target voltage closer than one regulator tap step voltage.

14. The system as recited in claim 8, wherein the processor is further configured to:
process the voltage time series of the supplied electricity along multiple paths;
filter the voltage time series to derive a filtered voltage time series;
estimate a smooth delay compensated zero-mean dispersion or variance of the voltage time series; and
produce a delay compensated smoothed negative peak envelope of the voltage time series.

15. A non-transitory computer readable storage medium comprising instructions which when executed by a processor comprise instructions to:
detect measurements of electricity supplied to one or more devices via a voltage regulator;
compute an estimated deviant voltage level based on varying electrical consumption by the one or more electrical devices, the estimated deviant voltage level computed based on a predetermined confidence level and the measurements, wherein the predetermined confidence level corresponds to a probability distribution indicative of a characteristic of the electricity supplied to the electrical device; and provide a signal to adjust a voltage level output of the electricity supplied to the one or more electrical devices based on the computed estimated deviant voltage level.

16. The non-transitory computer readable storage medium as recited in claim 15, wherein the power source has a multiple tap settings with each tap settings supplying electricity with a different voltage level, and wherein the provided signal to adjust the voltage level output of the electricity supplied to the one or more electrical devices based on the computed deviant voltage level comprises:

indicating a selection of one of the multiple tap settings to supply electricity to the one or more electrical devices based on the computed estimated deviant voltage level.

17. The non-transitory computer readable storage medium of claim 16, wherein the instructions further comprise instructions to:

assert a decrease in one of the multiple tap settings if either a selected estimated deviant voltage exceeds a predetermined voltage level derived from a setpoint voltage or an accumulated nonlinear weighted time integral of a selected minimum estimated deviant voltage exceeds the predetermined voltage level.

18. The non-transitory computer readable storage medium of claim 16, wherein the instructions further comprise instructions to:

assert an increase in one of the multiple tap settings if either a selected estimated deviant voltage fall below a predetermined voltage level derived from a setpoint voltage, or an accumulated nonlinear weighted time integral of a selected minimum estimated deviant voltage falls below the predetermined voltage level.

19. The non-transitory computer readable storage medium as recited in claim 15, wherein the instructions, which when executed by a processor to compute an estimated deviant voltage level, further comprise instructions to:

(i) estimate a low-pass spectral behavior of each observed voltage time series of the electricity supplied to the one or more electrical devices, with a spectral cutoff frequency consistent with a voltage adjustment decision period;

(ii) estimate a dispersion or variance of each observed voltage time series;

(iii) estimate a first-order envelope of the minimum values of each observed voltage time series;

(iv) apply weighting factors to the estimated dispersions consistent with configured confidence specifications thereby estimating a voltage deviation that will not be exceeded with the specified confidence;

(v) compute a forecast minimum for each observed voltage from the results in (i), (iii), and (iv) and selecting a forecast minimum voltage from these results;

(vi) compare the selected forecast minimum voltage against a prespecified voltage bound;

(vii) increment a nonlinear weighted time integral for the selected forecast minimum voltage if the forecast minimum voltage is less than one regulator tap step voltage below the target but greater than a lower voltage bound; and (viii) decrement a nonlinear weighted time integral if the selected forecast minimum voltage approaches the target voltage closer than one regulator tap step voltage.

20. The non-transitory computer readable storage medium as recited in claim 15, wherein the instructions further comprise instructions to:

filter the voltage time series to derive a filtered voltage time series;

estimate a smooth delay compensated zero-mean dispersion of the voltage time series; and produce a delay compensated smoothed negative peak envelope of the voltage time series.

\* \* \* \* \*